US012531017B1

(12) United States Patent
Lee et al.

(10) Patent No.: US 12,531,017 B1
(45) Date of Patent: Jan. 20, 2026

(54) PRODUCING CONSISTENT GAMMA IN ORGANIC LIGHT-EMITTING DIODE DISPLAY DEVICES

(71) Applicant: DELL PRODUCTS L.P., Round Rock, TX (US)

(72) Inventors: Bongjun Lee, Singapore (SG); Seungjoo Choi, Singapore (SG); Kyoungjun Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/035,664

(22) Filed: Jan. 23, 2025

(51) Int. Cl.
*G09G 3/32* (2016.01)
*G09G 3/3208* (2016.01)
*G09G 3/20* (2006.01)

(52) U.S. Cl.
CPC ......... *G09G 3/3208* (2013.01); *G09G 3/2092* (2013.01); *G09G 2320/0233* (2013.01); *G09G 2320/0242* (2013.01); *G09G 2320/0653* (2013.01); *G09G 2320/0673* (2013.01); *G09G 2340/0435* (2013.01); *G09G 2340/16* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 10,276,081 | B2 | 4/2019 | Ong et al. | |
| 2020/0400984 | A1* | 12/2020 | Liang | G02F 1/13306 |
| 2022/0230575 | A1 | 7/2022 | Chung et al. | |
| 2023/0326395 | A1* | 10/2023 | Pyo | G09G 3/32 |
| 2024/0046897 | A1* | 2/2024 | Wang | G06V 10/60 |

* cited by examiner

*Primary Examiner* — Roy P Rabindranath
(74) *Attorney, Agent, or Firm* — Larson Newman, LLP

(57) ABSTRACT

An information handling system determines an average picture level percentage of a previous frame and determines a brightness level of a current frame based on the average picture level percentage of the previous frame. The information handling system also determines a panel gray level based on the brightness level of the current frame.

20 Claims, 10 Drawing Sheets

300

| | APL 3% | | APL 5% | | APL 10% | | APL 25% | | APL 50% | | APL 100% | |
|---|---|---|---|---|---|---|---|---|---|---|---|---|
| S_Gray | P_Gray | Lgray | P_Gray | Lgray | P_Gray | Lgray | P_Gray | Lgray | P_Gray | Lgray | P_Gray | Lgray |
| 0 | 0 | 0.00 | 0 | 0.00 | 0 | 0.00 | 0 | 0.00 | 0 | 0.00 | 0 | 0.00 |
| 8 | 8 | 0.49 | 9.0 | 0.49 | 11.0 | 0.49 | 12.0 | 0.49 | 12.9 | 0.49 | 13.8 | 0.49 |
| 16 | 16 | 2.26 | 18.0 | 2.26 | 21.9 | 2.26 | 24.0 | 2.26 | 25.8 | 2.26 | 27.7 | 2.26 |
| 24 | 24 | 5.52 | 27.1 | 5.52 | 32.9 | 5.52 | 36.1 | 5.52 | 38.7 | 5.52 | 41.5 | 5.52 |
| 32 | 32 | 10.40 | 36.1 | 10.40 | 43.8 | 10.40 | 48.1 | 10.40 | 51.6 | 10.40 | 55.3 | 10.40 |
| 40 | 40 | 16.99 | 45.1 | 16.99 | 54.8 | 16.99 | 60.1 | 16.99 | 64.5 | 16.99 | 69.1 | 16.99 |
| 48 | 48 | 25.37 | 54.1 | 25.37 | 65.8 | 25.37 | 72.1 | 25.37 | 77.4 | 25.37 | 83.0 | 25.37 |
| 56 | 56 | 35.61 | 63.2 | 35.61 | 76.7 | 35.61 | 84.2 | 35.61 | 90.3 | 35.61 | 96.8 | 35.61 |
| 64 | 64 | 47.78 | 72.2 | 47.78 | 87.7 | 47.78 | 96.2 | 47.78 | 103.2 | 47.78 | 110.6 | 47.78 |
| 72 | 72 | 61.91 | 81.2 | 61.91 | 98.6 | 61.91 | 108.2 | 61.91 | 116.0 | 61.91 | 124.5 | 61.91 |
| 80 | 80 | 78.06 | 90.2 | 78.06 | 109.6 | 78.06 | 120.2 | 78.06 | 128.9 | 78.06 | 138.3 | 78.06 |
| 88 | 88 | 96.27 | 99.3 | 96.27 | 120.6 | 96.27 | 132.3 | 96.27 | 141.8 | 96.27 | 152.1 | 96.27 |
| 96 | 96 | 116.58 | 108.3 | 116.58 | 131.5 | 116.58 | 144.3 | 116.58 | 154.7 | 116.58 | 165.9 | 116.58 |
| 104 | 104 | 139.02 | 117.3 | 139.02 | 142.5 | 139.02 | 156.3 | 139.02 | 167.6 | 139.02 | 179.8 | 139.02 |
| 112 | 112 | 163.64 | 126.3 | 163.64 | 153.5 | 163.64 | 168.3 | 163.64 | 180.5 | 163.64 | 193.6 | 163.64 |
| 120 | 120 | 190.46 | 135.4 | 190.46 | 164.4 | 190.46 | 180.3 | 190.46 | 193.4 | 190.46 | 207.4 | 190.46 |
| 128 | 128 | 219.52 | 144.4 | 219.52 | 175.4 | 219.52 | 192.4 | 219.52 | 206.3 | 219.52 | 221.2 | 219.52 |
| 136 | 136 | 250.84 | 153.4 | 250.84 | 186.3 | 250.84 | 204.4 | 250.84 | 219.2 | 250.84 | 235.1 | 250.84 |
| 144 | 144 | 284.45 | 162.4 | 284.45 | 197.3 | 284.45 | 216.4 | 284.45 | 232.1 | 284.45 | 248.9 | 284.45 |
| 152 | 152 | 320.38 | 171.5 | 320.38 | 208.3 | 320.38 | 228.4 | 320.38 | 245.0 | 320.38 | 255.0 | 300.00 |
| 160 | 160 | 358.65 | 180.5 | 358.65 | 219.2 | 358.65 | 240.5 | 358.65 | 255.0 | 349.90 | 255.0 | 300.00 |
| 168 | 168 | 399.29 | 189.5 | 399.29 | 230.2 | 399.29 | 252.5 | 399.29 | 255.0 | 349.90 | 255.0 | 300.00 |
| 176 | 176 | 442.32 | 198.5 | 442.32 | 241.1 | 442.32 | 255.0 | 408.11 | 255.0 | 349.90 | 255.0 | 300.00 |
| 184 | 184 | 487.77 | 207.6 | 487.77 | 252.1 | 487.77 | 255.0 | 408.11 | 255.0 | 349.90 | 255.0 | 300.00 |
| 192 | 192 | 535.64 | 216.6 | 535.64 | 255.0 | 500.17 | 255.0 | 408.11 | 255.0 | 349.90 | 255.0 | 300.00 |
| 200 | 200 | 585.97 | 225.6 | 585.97 | 255.0 | 500.17 | 255.0 | 408.11 | 255.0 | 349.90 | 255.0 | 300.00 |
| 208 | 208 | 638.78 | 234.6 | 638.78 | 255.0 | 500.17 | 255.0 | 408.11 | 255.0 | 349.90 | 255.0 | 300.00 |
| 216 | 216 | 694.08 | 243.6 | 694.08 | 255.0 | 500.17 | 255.0 | 408.11 | 255.0 | 349.90 | 255.0 | 300.00 |
| 224 | 224 | 751.90 | 252.7 | 751.90 | 255.0 | 500.17 | 255.0 | 408.11 | 255.0 | 349.90 | 255.0 | 300.00 |
| 232 | 232 | 812.24 | 255.0 | 767.23 | 255.0 | 500.17 | 255.0 | 408.11 | 255.0 | 349.90 | 255.0 | 300.00 |
| 240 | 240 | 875.14 | 255.0 | 767.23 | 255.0 | 500.17 | 255.0 | 408.11 | 255.0 | 349.90 | 255.0 | 300.00 |
| 248 | 248 | 940.60 | 255.0 | 767.23 | 255.0 | 500.17 | 255.0 | 408.11 | 255.0 | 349.90 | 255.0 | 300.00 |
| 255 | 255 | 1000.00 | 255.0 | 767.23 | 255.0 | 500.17 | 255.0 | 408.11 | 255.0 | 349.90 | 255.0 | 300.00 |

FIG. 3

500

| | APL 3% | | APL 5% | | APL 10% | | APL 25% | | APL 50% | | APL 100% | |
|---|---|---|---|---|---|---|---|---|---|---|---|---|
| S_Gray | P_Gray | Lgray | P_Gray | Lgray | P_Gray | Lgray | P_Gray | Lgray | P_Gray | Lgray | P_Gray | Lgray |
| 0 | 0 | 0.00 | 0 | 0.00 | 0 | 0.00 | 0 | 0.00 | 0 | 0.00 | 0 | 0.00 |
| 8 | 8 | 0.25 | 8.0 | 0.25 | 8.0 | 0.25 | 8.8 | 0.25 | 9.4 | 0.25 | 10.1 | 0.25 |
| 16 | 16 | 1.17 | 16.0 | 1.17 | 16.0 | 1.17 | 17.5 | 1.17 | 18.8 | 1.17 | 20.2 | 1.17 |
| 24 | 24 | 2.84 | 24.0 | 2.84 | 24.0 | 2.84 | 26.3 | 2.84 | 28.2 | 2.84 | 30.3 | 2.84 |
| 32 | 32 | 5.35 | 32.0 | 5.35 | 32.0 | 5.35 | 35.1 | 5.35 | 37.6 | 5.35 | 40.4 | 5.35 |
| 40 | 40 | 8.75 | 40.0 | 8.75 | 40.0 | 8.75 | 43.9 | 8.75 | 47.0 | 8.75 | 50.5 | 8.75 |
| 48 | 48 | 13.07 | 48.0 | 13.07 | 48.0 | 13.07 | 52.6 | 13.07 | 56.5 | 13.07 | 60.5 | 13.07 |
| 56 | 56 | 18.34 | 56.0 | 18.34 | 56.0 | 18.34 | 61.4 | 18.34 | 65.9 | 18.34 | 70.6 | 18.34 |
| 64 | 64 | 24.60 | 64.0 | 24.60 | 64.0 | 24.60 | 70.2 | 24.60 | 75.3 | 24.60 | 80.7 | 24.60 |
| 72 | 72 | 31.88 | 72.0 | 31.88 | 72.0 | 31.88 | 79.0 | 31.88 | 84.7 | 31.88 | 90.8 | 31.88 |
| 80 | 80 | 40.20 | 80.0 | 40.20 | 80.0 | 40.20 | 87.7 | 40.20 | 94.1 | 40.20 | 100.9 | 40.20 |
| 88 | 88 | 49.58 | 88.0 | 49.58 | 88.0 | 49.58 | 96.5 | 49.58 | 103.5 | 49.58 | 111.0 | 49.58 |
| 96 | 96 | 60.04 | 96.0 | 60.04 | 96.0 | 60.04 | 105.3 | 60.04 | 112.9 | 60.04 | 121.1 | 60.04 |
| 104 | 104 | 71.60 | 104.0 | 71.60 | 104.0 | 71.60 | 114.1 | 71.60 | 122.3 | 71.60 | 131.2 | 71.60 |
| 112 | 112 | 84.27 | 112.0 | 84.27 | 112.0 | 84.27 | 122.8 | 84.27 | 131.7 | 84.27 | 141.3 | 84.27 |
| 120 | 120 | 98.09 | 120.0 | 98.09 | 120.0 | 98.09 | 131.6 | 98.09 | 141.1 | 98.09 | 151.4 | 98.09 |
| 128 | 128 | 113.05 | 128.0 | 113.05 | 128.0 | 113.05 | 140.4 | 113.05 | 150.5 | 113.05 | 161.5 | 113.05 |
| 136 | 136 | 129.18 | 136.0 | 129.18 | 136.0 | 129.18 | 149.2 | 129.18 | 160.0 | 129.18 | 171.5 | 129.18 |
| 144 | 144 | 146.49 | 144.0 | 146.49 | 144.0 | 146.49 | 157.9 | 146.49 | 169.4 | 146.49 | 181.6 | 146.49 |
| 152 | 152 | 165.00 | 152.0 | 165.00 | 152.0 | 165.00 | 166.7 | 165.00 | 178.8 | 165.00 | 191.7 | 165.00 |
| 160 | 160 | 184.71 | 160.0 | 184.71 | 160.0 | 184.71 | 175.5 | 184.71 | 188.2 | 184.71 | 201.8 | 184.71 |
| 168 | 168 | 205.64 | 168.0 | 205.64 | 168.0 | 205.64 | 184.2 | 205.64 | 197.6 | 205.64 | 211.9 | 205.64 |
| 176 | 176 | 227.80 | 176.0 | 227.80 | 176.0 | 227.80 | 193.0 | 227.80 | 207.0 | 227.80 | 222.0 | 227.80 |
| 184 | 184 | 251.20 | 184.0 | 251.20 | 184.0 | 251.20 | 201.8 | 251.20 | 216.4 | 251.20 | 232.1 | 251.20 |
| 192 | 192 | 275.86 | 192.0 | 275.86 | 192.0 | 275.86 | 210.6 | 275.86 | 225.8 | 275.86 | 242.2 | 275.86 |
| 200 | 200 | 301.78 | 200.0 | 301.78 | 200.0 | 301.78 | 219.3 | 301.78 | 235.2 | 301.78 | 252.3 | 301.78 |
| 208 | 208 | 328.97 | 208.0 | 328.97 | 208.0 | 328.97 | 228.1 | 328.97 | 244.6 | 328.97 | 255.0 | 309.00 |
| 216 | 216 | 357.45 | 216.0 | 357.45 | 216.0 | 357.45 | 236.9 | 357.45 | 254.0 | 357.45 | 255.0 | 309.00 |
| 224 | 224 | 387.23 | 224.0 | 387.23 | 224.0 | 387.23 | 245.7 | 387.23 | 255.0 | 360.40 | 255.0 | 309.00 |
| 232 | 232 | 418.30 | 232.0 | 418.30 | 232.0 | 418.30 | 254.4 | 418.30 | 255.0 | 360.40 | 255.0 | 309.00 |
| 240 | 240 | 450.70 | 240.0 | 450.70 | 240.0 | 450.70 | 255.0 | 420.35 | 255.0 | 360.40 | 255.0 | 309.00 |
| 248 | 248 | 484.41 | 248.0 | 484.41 | 248.0 | 484.41 | 255.0 | 420.35 | 255.0 | 360.40 | 255.0 | 309.00 |
| 255 | 255 | 515.00 | 255.0 | 515.00 | 255.0 | 515.00 | 255.0 | 420.35 | 255.0 | 360.40 | 255.0 | 309.00 |

FIG. 5

PRODUCING CONSISTENT GAMMA IN ORGANIC LIGHT-EMITTING DIODE DISPLAY DEVICES

FIELD OF THE DISCLOSURE

The present disclosure generally relates to information handling systems, and more particularly relates to producing consistent gamma in organic light-emitting diode display devices.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communication among information handling systems may be via networks that are wired, wireless, or some combination.

SUMMARY

An information handling system may determine the average picture level percentage of a previous frame and determine a brightness level of a current frame based on the average picture level percentage of the previous frame. The information handling system also may determine a panel gray level based on the brightness level of the current frame.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a table of gray level values for producing consistent gamma in OLED display devices, according to an embodiment of the present disclosure;

FIG. 5 is a table of gray level values for producing consistent gamma in OLED display devices, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
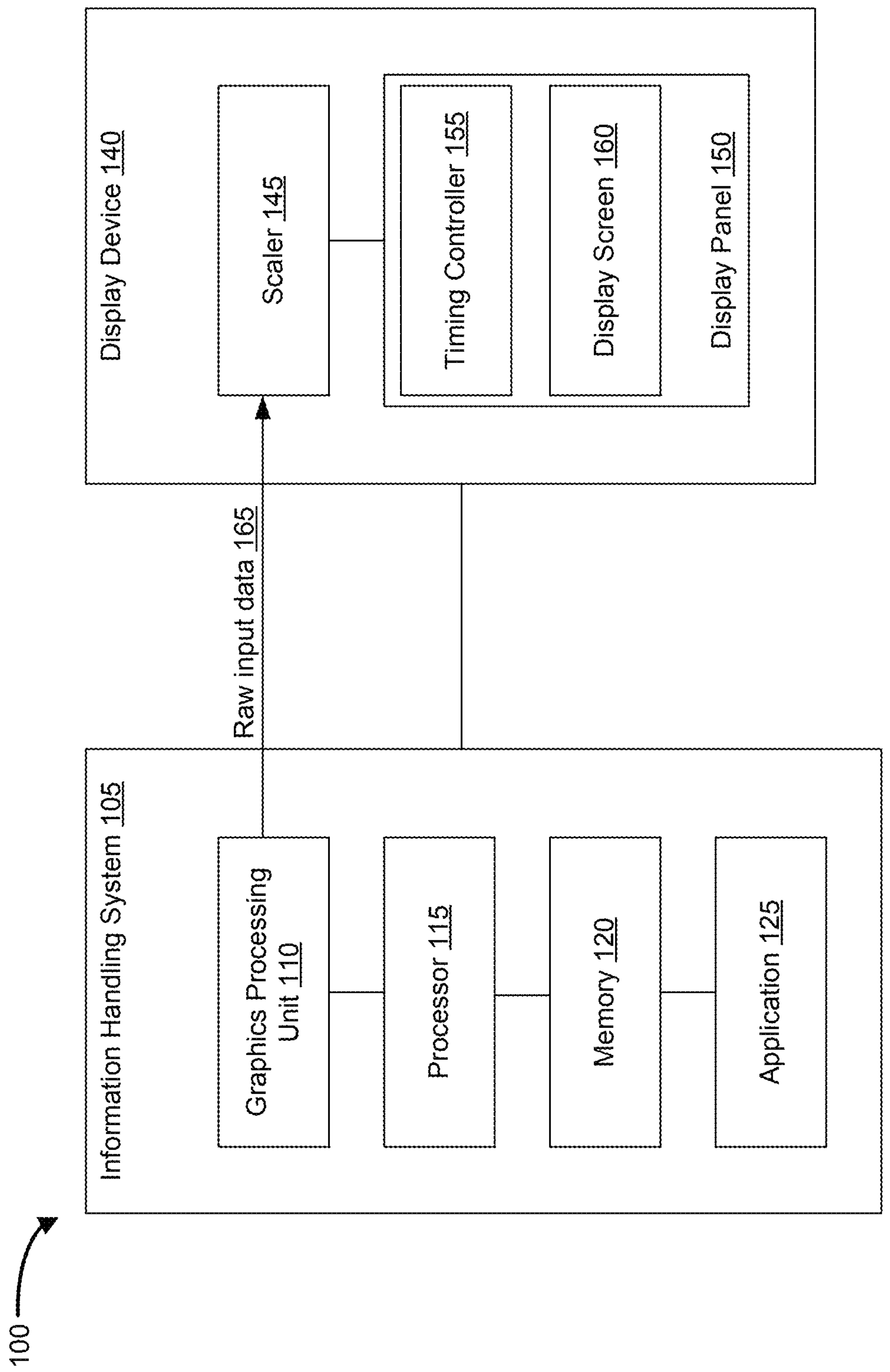
FIG. 1 is a block diagram of an information handling system for producing consistent gamma in organic light-emitting diode (OLED) display devices, according to an embodiment of the present disclosure.

FIG. 1 illustrates a portion of a system 100 for producing consistent gamma in an organic light-emitting diode (OLED) display device, according to an embodiment of the present disclosure. System 100 includes an information handling system 105 and a display device 140. Information handling system 105 includes a graphics processing unit (GPU) 110, a processor 115, a memory 120, and an application 125. Display device 140 includes a scaler 145 and a display panel 150 which further includes a timing controller 155 and a display screen 160. Information handling system 105 may be connected to display device 140. In addition, components of information handling system 105, such as GPU 110, processor 115, memory 120, and application 125 may be interconnected. Similarly, components of display device 140, such as scaler 145, timing controller 155, and display screen 160 may also be interconnected. However, any variety of connections between these components is envisioned as falling within the scope of the present disclosure. In addition, connections between components may be omitted for descriptive clarity.

Figure 10:
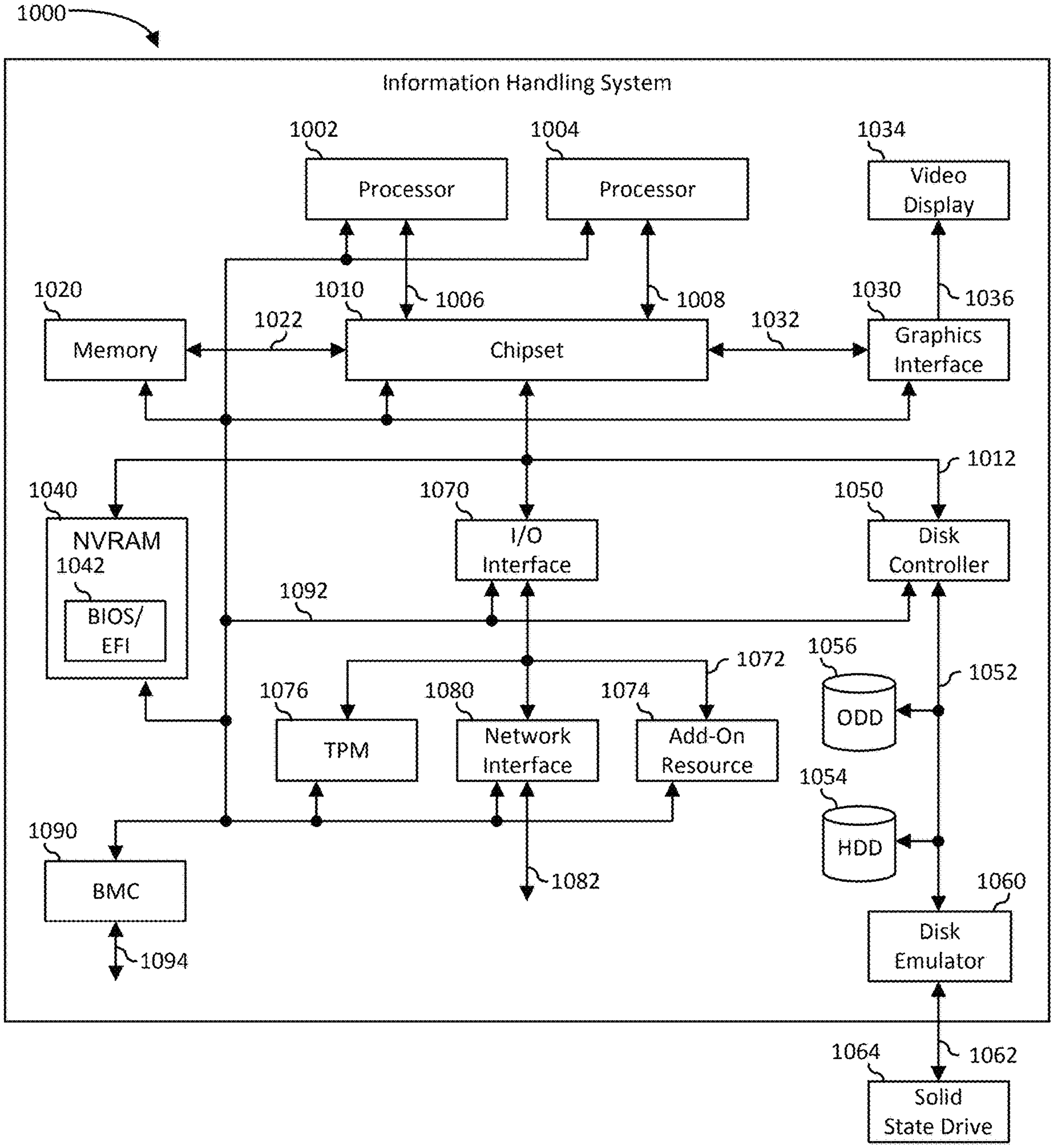
FIG. 10 is a block diagram illustrating a general information handling system, according to an embodiment of the present disclosure.

Information handling system 105, which is similar to information handling system 1000 of FIG. 10, maybe a desktop computer, a laptop computer, a tablet computer, a handheld device, a cellular phone, a notebook computer, or any suitable information handling system. GPU 110 may comprise any system, device, or apparatus that may be similar to graphics adapter 1030 of FIG. 10. In one embodiment, GPU 110 may be a discrete GPU, such that it is not integrated within another processor of information handling system 105. In other embodiments, GPU 110 may be integrated with a processor of information handling system 105, such as processor 115. In one embodiment, GPU 110 may be configured to provide data signals as input to display device 140, such as raw input data 165. In particular, GPU 110 may provide raw input data 165 to scaler 145. In one example, raw input data 165 includes raw image data for display at display device 140. The raw image data may include one or more frames. Processor 115 may comprise any system, device, or apparatus that may be similar to processors 1002 and 1004 of FIG. 10.

Memory 120 may comprise any system, device, or apparatus that may be similar to memory 1020 of FIG. 10. Memory 120 may be a system memory and/or a non-volatile random access memory (NVRAM) which is generally configured to store software and/or firmware, such as application 125, and one or more sets of data that can be utilized during the operation of information handling system 105 and/or display device 140. Application 125 may be any software application, such as a word processing application, spreadsheet application, photo editing application, etc. that may be associated with providing at least a portion of information or data for raw input data 165.

Display device 140 may comprise any system, device, or apparatus that may be similar to video display 1034 of FIG. 10. Generally speaking, display device 140 may be any type of OLED display capable of displaying alphanumeric data, images, video content, graphical user interfaces, etc. on display screen 160. Display device 140 may be configured to receive a signal from a source, such as raw input data 165. The source may be an information handling system, such as information handling system 105, a digital video disc (DVD) player, etc. Display device 140 may be a part of, or communicatively coupled to information handling system 105. For example, display device 140 may be permanently or detachably affixed to information handling system 105 when information handling system 105 is a laptop computer, a table, a "2 in 1" system, a mobile device, or similar.

Alternatively, display device 140 may be a stand-alone display device, which is communicatively coupled to information handling system 105 via one or more cables and/or other interfaces, such as a docking station, when information handling system 105 is a desktop computer. Regardless of whether the display device is a stand-alone device or integrated with information handling system 105, display device 140 may be coupled to receive data signals and/or display configuration settings from a processing device, such as GPU 110 and processor 115 of information handling system 105.

OLED display devices, including quantum dot OLED (QD-OLED) display devices, generally have a function of calculating an average luminance of a display screen, also referred to as average picture level (APL), to lower the luminance and maintain power consumption. The APL may indicate a percentage of the display screen that is lit up compared to a full white display screen. In addition, OLED display devices generally use panel gamma as is, which typically leads to an uneven gamma curve and issues with luminance variation. These issues typically occur due to changes in APL percentages, which generally lead to a misrepresentation of colors in a frame as intended.

The issues with gamma consistency and luminance variation are also typically apparent during a picture-by-picture (PBP) operation. In the PBP operation, display device 140 may display a first image from a first source in one area of display screen 160 and display a second image from a second source in the remaining area of display screen 160. When the first image is displayed in standard dynamic range (SDR) mode and the second image is displayed in high dynamic range (HDR) mode, the scaler and/or display panel typically fails to keep consistent gamma. Failure to keep consistent gamma and luminance is generally because the variation of the APL percentage in one section of the display screen in HDR mode impacts the gamma and luminance consistency of another section of the display screen in SDR mode.

To address the aforementioned issues among other concerns, the present disclosure provides a system and method to predict the panel gamma and adjust input gamma and/or the panel gamma based on the predicted panel gamma. The input gamma may refer to a gamma that is used when transferring an image from a scaler to a timing controller. The panel gamma may refer to a gamma that a timing controller and/or display panel expresses the values of the input gamma from the scaler. In one embodiment, a scaler may compensate the input gamma by calculating the APL percentage, which typically changes with each frame. In another embodiment, a timing controller instead of the scaler may compensate the input gamma to provide a coherent gamma output. This may result in an even or consistent gamma.

Scaler 145 may comprise any system, device, or apparatus that may be configured to perform or facilitate one or more display support functions. For example, scaler 145 may be configured to receive raw input data 165 from GPU 110 and/or processor 115 and process the received raw input data, such as decoding the data into a digital pixel format and performing gamma correction. In addition, scaler 145 may be configured to convert the resolution of the received raw input data to a resolution of display device 140. For example, scaler 145 may upscale or downscale the resolution of the received raw input data to accommodate the resolution of display device 140 or a portion thereof.

Scaler 145 may be configured to support two or more color spaces. Each supported color space may be utilized by scaler 145 in predicting panel gamma and adjusting the input gamma accordingly. The input gamma may refer to a gamma when transferring an image frame from scaler 145 to display panel 150. The panel gamma may refer to a gamma that expresses the values of the input gamma from scaler 145. In adjusting the input gamma, scaler 145 may be configured to calculate the APL percentage of a previous frame, also referred to as an N−1 frame. In addition, scaler 145 may be configured to calculate the maximum brightness of a current frame, also referred to as an N frame, based on the APL percentage of the previous frame. Further, scaler 145 may also be configured to calculate the brightness of each gray level that fits the panel gamma.

Display panel 150 may comprise any system, device, or apparatus that may be configured for displaying images on display screen 160. Display panel 150 presents visual images with OLED pixels having red, green, and blue (RGB) subpixels. In addition, each pixel may be assigned a value of gray level between 0 and 255. Display panel 150 may include a variety of different types of OLED display panels. In one embodiment, display panel 150 and/or timing controller 155 may adjust the panel gamma based on the APL percentage of the previous frame. As such, the input gamma transmitted by scaler 145 may be different than the panel gamma when the image is displayed at display panel 150. For example, when an APL percentage is at 10% and scaler 145 transmits a frame with an input gray value of 255 with a luminance of 1,000 candelas per square meter, also referred to as nits, display panel 150 and/or timing controller 155 may lower the luminance to 500 nits based on the APL percentage.

Timing controller 155 may comprise any system, device, or apparatus configured to provide current to each pixel repeated over time so that an OLED material is excited to illuminate a desired amount of light. Timing controller 155 may also be configured to calculate the maximum brightness of the previous frame. In addition, timing controller 155 may be configured to calculate the maximum brightness of the current frame. Further, timing controller 155 may be configured to calculate the panel gamma based on an adjusted gray level of the current frame. Display screen 160 may be a surface configured to render text, graphics, and/or video for viewing.

Those of ordinary skill in the art will appreciate that the configuration, hardware, and/or software components of system 100 depicted in FIG. 1 may vary. For example, the illustrative components within system 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
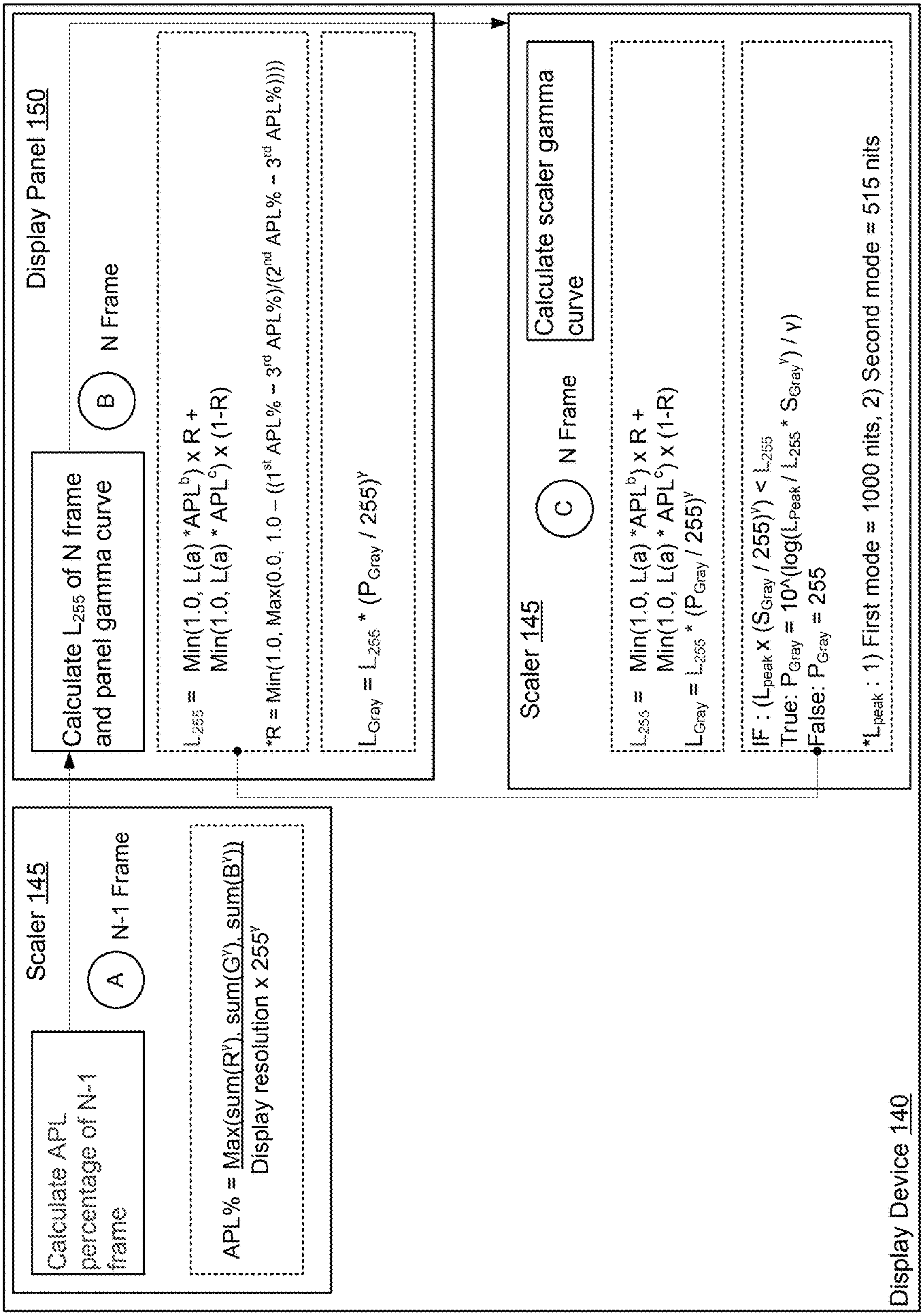
FIG. 2 is a block diagram of a display device for producing consistent gamma in OLED display devices, according to an embodiment of the present disclosure.

FIG. 2 illustrates a portion of display device 140 configured for the prediction of panel gamma and adjustment of an input gamma, according to an embodiment of the present disclosure. FIG. 2 is annotated with a series of letters A-C. Each of these letters represents a stage of one or more operations. Although these stages may be ordered for this example, the stages illustrate one example to aid in understanding this disclosure and should not be used to limit the claims. Subject matter falling within the scope of the claims can vary with respect to the order of the operations.

At stage A, scaler 145 and/or a timing controller of display panel 150 may calculate an APL percentage of a previous frame according to a full screen's color scape gray levels. The previous frame may be included in the raw input data that was received from a GPU or processor of an information handling system. The calculation may be according to a equation (1) shown below. The APL percentage may be transmitted to the timing controller of display panel 150.

$$APL\text{ percentage} = \frac{\text{Max}(\text{sum}(R^{\gamma}), \text{sum}(G^{\gamma}), \text{sum}(B^{\gamma}))}{\text{Display Resolution} * 255^{\gamma}} \quad \text{EQ. (1)}$$

An APL percentage may refer to the average brightness of an image across a display screen. An APL 100% indicates a completely bright image while a lower APL percentage indicates a darker image. In one embodiment, the APL percentage may be based on calculating a full screen's red, green, and blue (RGB) gray levels. The gamma (γ) may have a value of 1.8, 2.2, 2.8, or other suitable or standardized value of gamma. Generally, a timing controller uses 2.2 gamma. However, the timing controller may use other gamma values after coordinating with the scaler. The display resolution refers to the number of pixels on a display screen, which is typically indicated as width×height. Common display resolutions include 4K ultra-high definition (UHD) at 3840×2160, full high definition at 1920×1080, etc. In this example, the maximum sum of RGB gray level values may be divided by the size of the display panel at full screen at maximum brightness.

In one particular example, the APL percentage of a 3×2 display resolution is shown below based on table 1, wherein table 1 indicates RGB gray level values of a previous frame. Table 2 indicates the RGB values raised to gamma 2.2.

TABLE 1

| | 1st column | | | 2nd column | | | 3rd column | | |
|---|---|---|---|---|---|---|---|---|---|
| | R | G | B | R | G | B | R | G | B |
| 1st row | 255 | 255 | 255 | 255 | 255 | 255 | 255 | 255 | 255 |
| 2nd row | 255 | 255 | 255 | 255 | 255 | 255 | 255 | 255 | 255 |

TABLE 2

| | 1st column | | | 2nd column | | |
|---|---|---|---|---|---|---|
| | R | G | B | R | G | B |
| 1st row | 196964.7 | 196964.7 | 196964.7 | 196964.7 | 196964.7 | 196964.7 |
| 2nd row | 196964.7 | 196964.7 | 196964.7 | 196964.7 | 196964.7 | 196964.7 |

| | 2nd column | | | SUM | | |
|---|---|---|---|---|---|---|
| | R | G | B | R | G | B |
| 1st row | 196964.7 | 196964,7 | 196964.7 | 1181788 | 1181788 | 1181788 |
| 2nd row | 196964.7 | 196964.7 | 196964.7 | | | |

Assuming a display resolution of three by two, calculating the APL percentage of the previous frame according to gamma 2.2 is shown below.

$$APL\ \% = \text{Max}(\text{Sum}(R^{2.2}), \text{Sum}(G^{2.2}), \text{Sum}(B^{2.2})) / \text{Resolution} * 255^{2.2}$$

$$APL\ \% = \frac{\text{Max}\begin{pmatrix} \text{Sum}(196964.7, 196964.7, 196964.7, 196964.7, 196964.7, 196964.7), \\ @\ \text{Sum}(196964.7, 196964.7, 196964.7, 196964.7, 196964.7, 196964.7), \\ @\ \text{Sum}(196964.7, 196964.7, 196964.7, 196964.7, 196964.7, 196964.7) \end{pmatrix}}{3 * 2 * 196964.7}$$

-continued $$APL\ \% = \frac{\text{Max}(1181788, 1181788, 1181788)}{1181788}$$

$$APL\ \% = \frac{1181788}{1181788} = 100\%$$

$$APL\ \% = 100\%$$

In another particular example, the APL percentage of the 3×2 display resolution is shown below based on table 3, wherein table 3 indicates RGB gray level values of the previous frame. Table 4 indicates the RGB values raised to gamma 2.2.

TABLE 3

| | 1st column | | | 2nd column | | | 3rd column | | |
|---|---|---|---|---|---|---|---|---|---|
| | R | G | B | R | G | B | R | G | B |
| 1st row | 127 | 255 | 63 | 15 | 31 | 15 | 79 | 15 | 15 |
| 2nd row | 15 | 31 | 15 | 127 | 255 | 63 | 15 | 15 | 15 |

TABLE 4

| | 1st column | | | 2nd column | | |
|---|---|---|---|---|---|---|
| | R | G | B | R | G | B |
| 1st row | 42497.97 | 196964.7 | 9089.693 | 386.7237 | 1909.834 | 386.7237 |
| 2nd row | 386.7237 | 1909.834 | 386.7237 | 42497.97 | 196964.7 | 9089.693 |

| | 2nd column | | | SUM | | |
|---|---|---|---|---|---|---|
| | R | G | B | R | G | B |
| 1st row | 14954.77 | 386.7237 | 386.7237 | 101110.9 | 398522.5 | 19726.28 |
| 2nd row | 386.7237 | 386.7237 | 386.7237 | | | |

$$APL\ \% = \text{Max}\left(\text{Sum}\left(R^{2.2}\right), \text{Sum}\left(G^{2.2}\right), \text{Sum}\left(B^{2.2}\right)\right) / \text{Resolution} * 255^{2.2}$$

$$APL\ \% = \frac{\text{Max}\begin{pmatrix} \text{Sum}(42497.97, 386.7237, 386.7237, 42497.97, 14954.77, 386.7237), \\ @\ \text{Sum}(196964.7, 1909.834, 1909.834, 196964.7, 386.7237, 386.7237), \\ @\ \text{Sum}(9089.693, 386.7237, 386.7237, 9089.693, 386.7237, 386.7237) \end{pmatrix}}{3 * 2 * 196964.7}$$

$$APL\ \% = \frac{\text{Max}(101110.9, 398522.5, 19726.28)}{1181788}$$

$$APL\ \% = \frac{398522.5}{1181788} = 34\%$$

$$R = \text{Min}(1.0, \text{Max}(0.0, 1.0 - (\text{first}APL\% - 3^{rd}APL\% / 2^{nd}APL\% - 3^{rd}APL\%))) \quad \text{EQ. (3)}$$

In the above calculations, L(a) may indicate brightness in nits at a first APL %, $APL^b$ may indicate a value of a function that connects L(a) to L(b), wherein L(b) may indicate brightness in nits at a second APL % and $APL^c$ may indicate a value of a function that connects L(a) to L(c), wherein L(c) may indicate brightness in nits at a third APL %. However, one of skill in the art may appreciate that $L_{255}$ may be calculated based on a different equation.

The timing controller of display panel 150 and/or scaler 145 may also calculate the brightness of each gray level, such as $P_{Gray}$ and/or $S_{Gray}$ values that fit a gamma value, as depicted in FIGS. 3 and 5. A $S_{Gray}$ value may refer to a scaler gray value based on peak luminance according to a gamma value. A $P_{Gray}$ value may refer to an adjusted input gray level value adjusted in consideration of the change to the panel gamma according to an APL percentage. The $P_{Gray}$ value may be associated with the current frame of an image. This brightness level is also referred to herein as $L_{Gray}$, which can then be used to determine and/or adjust the panel gamma. The calculated $L_{Gray}$ values with corresponding $P_{Gray}$ values may also be used to calculate panel gamma curves similar to gamma curves depicted in FIGS. 4 and 6. The calculation may be performed according to a equation (5) below. In one embodiment, the calculation may be made to fit a gamma 2.2 wherein $P_{Gray}$ may refer to a gray level value at the display panel.

$$L_{Gray} = L_{255} * (P_{Gray} / 255)^{\gamma} \quad \text{EQ. (5)}$$

At stage B, the timing controller of display panel 150 and/or scaler 145 may calculate the maximum brightness of a current frame based on an APL percentage of a previous frame. This maximum brightness is also referred to herein as $L_{255}$. The current frame may be part of raw input data received from a processor or GPU of an information handling system. The calculation of the maximum brightness may be based on the APL percentage of the previous frame that was determined at stage A. The APL percentage may be received from the timing controller of display panel 150 and/or scaler 145. In particular, the maximum brightness of the current frame may be calculated based on a equation (2), wherein "R" may be calculated according to equation (3) shown below.

$$L_{255} = \text{Min}(1.0, L(a) * APL^b) * R + \text{Min}(1.0, L(a) * APL^c) * (1 - R) \quad \text{EQ. (2)}$$

At stage C, scaler 145 and/or the timing controller of display panel 150 may calculate a scaler gamma curve of the current frame using adjusted gamma after predicting the panel gamma, which produces even gamma for maximum brightness. The adjusted gamma may be an adjusted input gamma and/or adjusted panel gamma. Accordingly, in one embodiment, scaler 145 and/or the timing controller may calculate the maximum brightness ($L_{255}$) and the brightness level $L_{Gray}$ similar to the calculation in stage B. In addition, the calculation performed to determine $L_{255}$ and $L_{Gray}$ may be performed in parallel with the calculations in stage B. Further, stages B and C can be performed simultaneously or in parallel after stage A. This is because of a frame delay when scaler 145 can use the results of the calculations by the timing controller. In another embodiment, scaler 145 and/or the timing controller may receive the values of $L_{255}$ and $L_{Gray}$ from the timing controller or scaler 145. In addition, scaler 145 and/or the timing controller of display panel 150 may calculate and/or adjust the input gamma according to a equation (6) below.

$$\text{IF } (L_{Peak}*(S_{Gray}/255)^{\gamma})<L_{255} \qquad \text{EQ. (6)}$$

True: $P_{Gray}$=10^(log($L_{Peak}/L_{255}*S_{Gray}^{\gamma}$)/γ)
False: $P_{Gray}$=255

A value of $L_{Peak}$, also referred to as peak luminance, at a particular mode may vary according to policy. For example, the peak luminance in a first display mode is 1000 nits and the peak luminance in a second mode is 515 nits. For example, the first display mode may be an SDR mode. $P_{Gray}$ indicates an input gray level value adjusted in consideration of the panel gamma according to the APL percentage of the previous frame. The scaler may also calculate the brightness of each gray level, such as $P_{Gray}$ and/or $S_{Gray}$ values that fit a gamma value, as depicted in FIGS. 3 and 5. The calculated $L_{Gray}$ values with corresponding $S_{Gray}$ values may also be used to generate one or more scaler gamma curves similar to gamma curves depicted in FIGS. 4 and 6. Because the maximum luminance, also referred to as maximum brightness changes according to APL percentage, the scaler gamma and/or panel gamma curves may constantly change, as such predicting the scaler gamma and/or panel gamma curves provides for a consistent gamma.

In one example, assuming that the display panel is set at a first display mode with a peak luminance of 1000 nits, a scaler may want to express an initial input gray level of 136 at a brightness level of 250 nits at gamma 2.2. The initial input gray level of 136 is also referred to as an $S_{Gray}$ value. In this example, the first display mode may be an HDR mode. However, with a further assumption of a previous frame's APL percentage to be at 25% with a maximum brightness of 408.1 nits, then a display panel may typically express the input gray level at a brightness level of 102.4 as shown in Table 5 below, which is not inline with the scaler's intention. Accordingly, to achieve the scaler's intention of the brightness level of 250 nits at gamma 2.2, the input gray level, also referred to herein as an initial scaler gray level, may be adjusted prior to transmission to the display panel by the scaler. In another embodiment, a timing controller may perform the adjustment instead. The value of the input gray level may be adjusted to a $P_{Gray}$ value of 204 as depicted by the calculation below.

$$\text{IF}(L_{Peak}*(S_{Gray}/255)^{\gamma})<L_{255}$$

True: $P_{Gray}$=10 ^((log ($L_{Peak}/L_{255}$)*$S_{Gray}^{\gamma}$)/γ)
False: $P_{Gray}$=255

$$\text{IF } (1000*(136/408.1)^{2.2})<255$$

$$\text{IF } (1000*(0.089)<255$$

$$\text{IF } 89.1<255=\text{True}$$

$$P_{Gray}=10\hat{}((\log(L_{Peak}/L_{255}*S_{Gray}^{\gamma})/\gamma)$$

$$P_{Gray}=10\hat{}((\log(1000/408.1*136^{2.2})/2.2)$$

$$P_{Gray}=204$$

Accordingly, the brightness level of the panel based on the adjusted input gamma value may be calculated as below.

$$L_{Gray}=L_{255}*(P_{Gray}/255)^{\gamma}$$

$$L_{Gray}=408.1*(204/255)^{2.2}$$

$$L_{Gray}=408*(0.8)^{2.2}$$

$$L_{Gray}=408*.61206$$

$$L_{Gray}=249.8$$

As shown in Table 5 and based on the calculations above, adjusting the input gray level to 204 allows the display panel to maintain the brightness level of approximately 250 nits as initially intended by the scaler.

TABLE 5

| Gray Level | Scaler gamma 2.2 Gamma_1000 nits | Panel gamma @APL 25% 2.2 Gamma_408.1 nits |
|---|---|---|
| 0 | 0 | 0 |
| 8 | 0.5 | 0.2 |
| 16 | 2.3 | 0.9 |
| 24 | 5.5 | 2.3 |
| 32 | 10.4 | 4.2 |
| 40 | 17 | 5.9 |
| 48 | 25.4 | 10.4 |
| 56 | 35.6 | 14.5 |
| 64 | 47.8 | 19.5 |
| 72 | 61.9 | 25.3 |
| 80 | 78.1 | 31.9 |
| 88 | 96.3 | 39.3 |
| 96 | 116.6 | 47.6 |
| 104 | 139 | 56.7 |
| 112 | 163.6 | 66.8 |
| 120 | 190.5 | 77.7 |
| 128 | 219.5 | 89.6 |
| 136 | 250.8 | 102.4 |
| 144 | 284.5 | 116.1 |
| 152 | 320.4 | 130.7 |
| 160 | 358.7 | 146.4 |
| 168 | 399.3 | 163 |
| 176 | 442.3 | 180.5 |
| 184 | 487.8 | 199.1 |
| 192 | 535.6 | 218.6 |
| 200 | 586 | 239.1 |
| 204 | 612.1 | 249.8 |
| 208 | 638.8 | 260.7 |
| 204 | 612.1 | 249.8 |
| 216 | 694.1 | 283.3 |
| 224 | 751.9 | 306.8 |
| 232 | 812.2 | 331.5 |
| 240 | 875.1 | 357.1 |
| 248 | 940.6 | 383.9 |
| 255 | 1000 | 408.1 |

It will be appreciated that the preceding examples are illustrative and are not limited to any particular embodiment for a system and method to produce consistent gamma in an OLED display device.

FIG. 3 illustrates a portion of a table 300 of gray level values associated with brightness levels according to various APL percentages for an exemplary display device, according to an embodiment of the present disclosure. Table 300 includes panel gray levels and associated brightness levels of particular APL percentages based on scaler gray levels that generally provide consistent gamma of a typical brightness level of 300 nits up to a maximum brightness level of 1000 nits at an APL 3%. Table 300 may be based on calculations similar to calculations performed by scaler 145 and display panel 150 of FIG. 2. Although the calculations can be performed at runtime, the calculations can be performed prior and table 300 may be used as a look-up table at runtime, wherein table 300 may be stored in a memory that is accessible by the scaler and/or a timing controller of a display panel at runtime.

Figure 4:
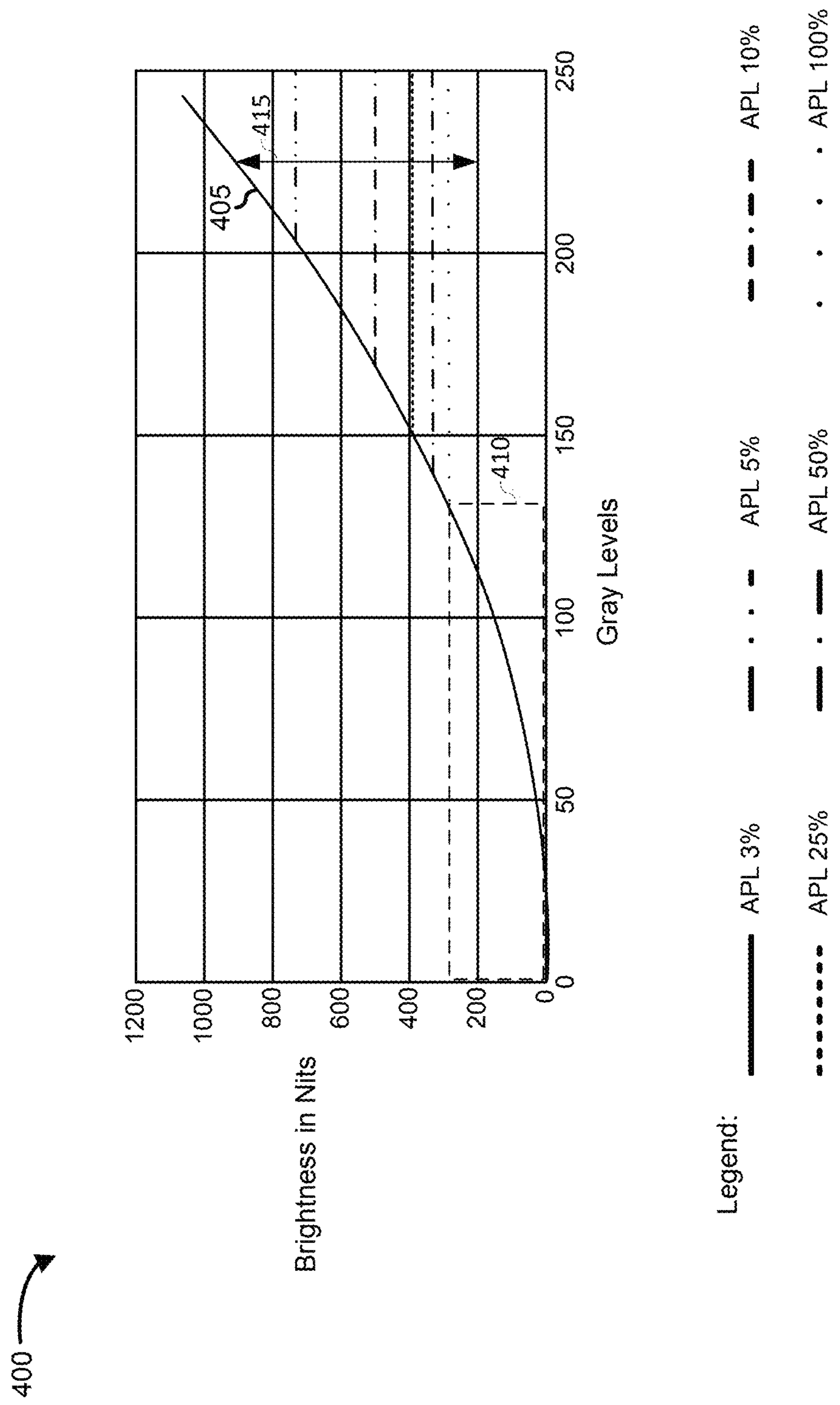
FIG. 4 is a graph of a gamma curve for producing consistent gamma in OLED display devices, according to an embodiment of the present disclosure.

FIG. 4 illustrates a graph 400 which depicts adjusted gamma curves associated with various APL percentages, according to an embodiment of the present disclosure. The gamma curves may be based on table 300 of FIG. 3. Graph 400 includes a Y-axis that may represent brightness levels in nits. Graph 400 also includes an X-axis that may represent gray-level values. In one example, graph 400 includes a gamma curve 405 that is associated with an APL 3% with a maximum luminous intensity of 1000 nits. In addition, graph 400 includes a section 410, which shows a consistent gamma of displays in SDR mode. Further, graph 400 includes a vertical line 415 that indicates peak brightness variation for displays in HDR mode. As depicted, the gamma curves tend to have a flat output from the point of maximum brightness or maximum luminance according to APL percentages.

FIG. 5 illustrates a portion of a table 500 of gray level values associated with brightness levels according to various APL percentages for an exemplary display device, according to an embodiment of the present disclosure. Table 300 includes panel gray levels and associated brightness levels of particular APL percentages based on scaler gray levels that generally provide consistent gamma of a typical brightness level of 300 nits up to a maximum brightness level of 500 nits at an APL 10%. Table 500 may be based on calculations similar to calculations performed by scaler 145 and display panel 150 of FIG. 2. Although the calculations can be performed at runtime, the calculations can be performed prior and table 500 may be used as a look-up table at runtime, wherein table 500 may be stored in a memory that is accessible by the scaler and/or a timing controller of a display panel at runtime.

Figure 6:
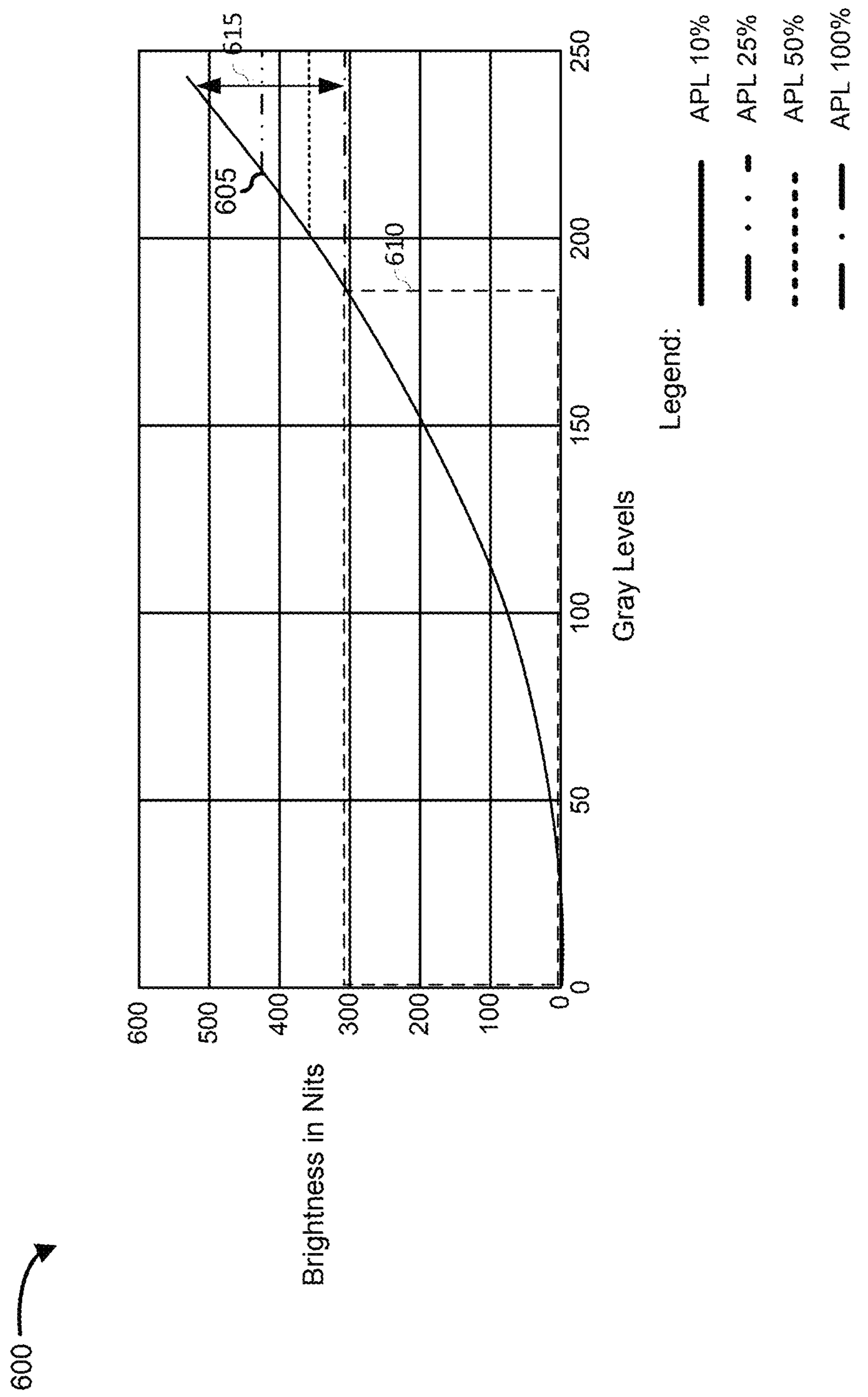
FIG. 6 is a graph of a gamma curve for producing consistent gamma in OLED display devices, according to an embodiment of the present disclosure.

FIG. 6 illustrates a graph 600 which depicts adjusted gamma curves associated with various APL percentages, according to an embodiment of the present disclosure. The gamma curves may be based on table 500 of FIG. 5. Graph 600 includes a Y-axis that may represent brightness levels in nits. Graph 600 also includes an X-axis that may represent gray-level values. In one example, graph 600 includes a gamma curve 605 that is associated with an APL 10% with a maximum luminous intensity of 500 nits. In addition, graph 600 includes a section 610, which shows a consistent gamma of displays in SDR mode. Further, graph 600 includes a vertical line 615 that indicates peak brightness variation for displays in HDR mode. As depicted, the gamma curves tend to have a flat output from the point of maximum brightness or maximum luminance according to APL percentages.

Figure 7:
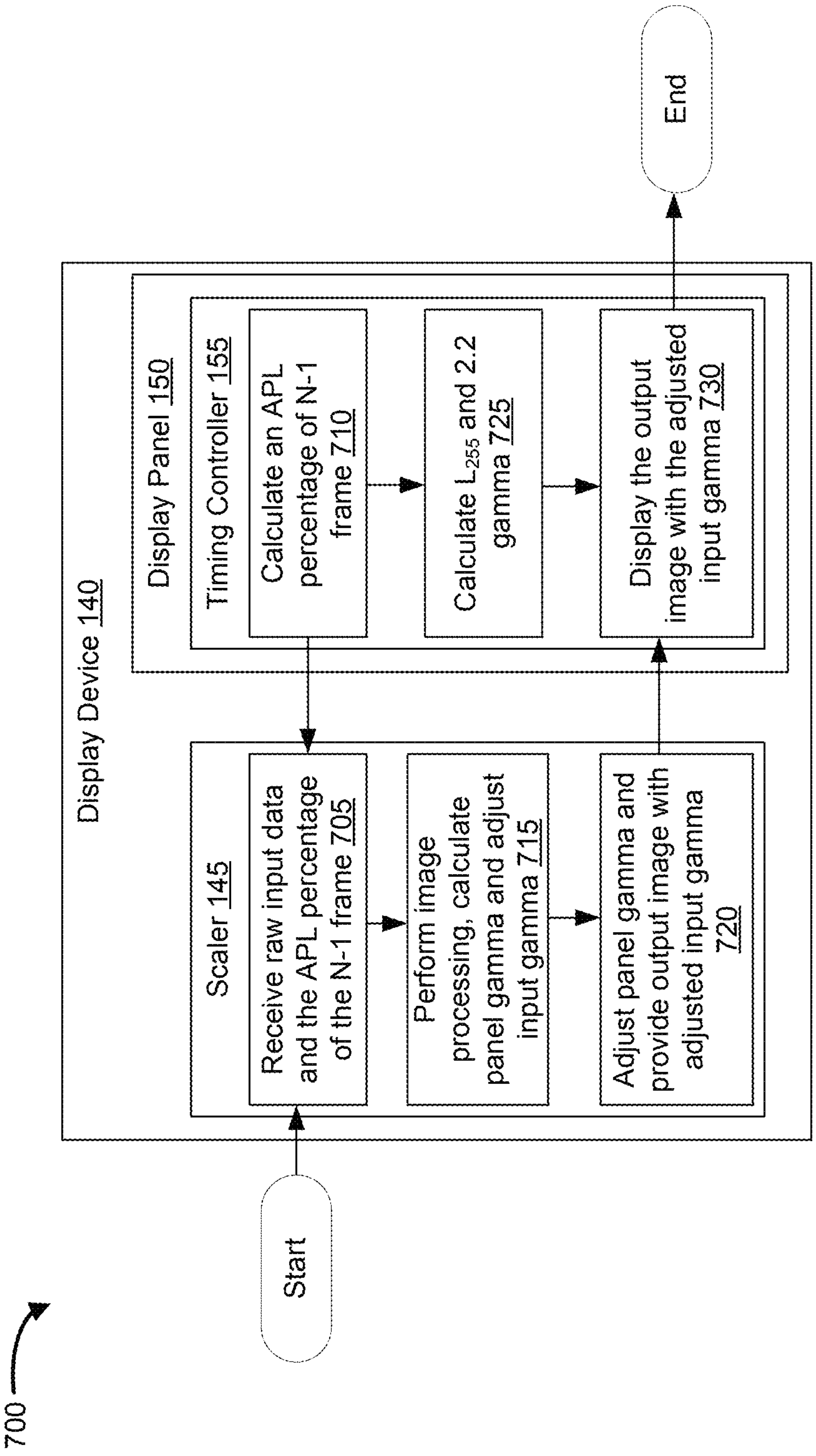
FIG. 7 is a block diagram of a display device for producing consistent gamma in OLED display devices, according to an embodiment of the present disclosure.

FIG. 7 illustrates a portion of a flowchart of a method 700 for producing consistent gamma in an OLED display device, according to an embodiment of the present disclosure. Method 700 may be performed by any suitable component of display device 140 including, but not limited to scaler 145 and display panel 150 further includes timing controller 155 of FIG. 1. While embodiments of the present disclosure are described in terms of the components of display device 140 of FIG. 1, it should be recognized that other components may be utilized to perform the described method.

One of skill in the art will appreciate that this flow chart explains a typical example, which can be extended to applications or services in practice. It will be readily appreciated that not every block set forth in this flow diagram is always necessary and that certain blocks of method 700 may be combined, performed simultaneously, in a different order, or perhaps omitted, without varying from the scope of the disclosure. In addition, while embodiments of the present disclosure are described in terms of display device 140 of FIG. 1, it should be recognized that other systems may be utilized to perform the described method.

Method 700 typically starts at block 705 wherein scaler 145 may receive raw input data that may also include raw image data as input from a processor or a GPU of an information handling system. Scaler 145 may also receive the APL percentage of a previous (N−1) frame from timing controller 155. Timing controller 155 may calculate the APL percentage of the previous frame associated with the raw input data at block 710. The calculation of the APL percentage may be based on the equation (1) above as discussed in FIG. 2. After receiving the raw input data and the APL percentage of the previous frame, the method may proceed to block 715.

At block 715, scaler 145 may process the raw input data which can include manipulating the raw image data to adjust various properties, such as resolution, refresh rate, etc. according to current computer graphics technology resulting in an output image. Scaler 145 may also determine a panel gamma via calculating a panel gray level according to equation (5) above, wherein the calculation is based on the APL percentage received from timing controller 155. The method may also calculate and adjust the input gamma based on the panel gray level. The input gamma may be calculated according to equation (6) above as discussed in FIG. 2. Typically, the display panel changes gamma according to APL percentage, but this generally results in inconsistent gamma. To achieve the same gamma, the present disclosure may reverse this change to express the same gamma by adjusting the input gamma via adjusting an input gray level, also referred to as a scaler gray level.

For example, the scaler may calculate and adjust an initial gray level associated with the output image that may provide a brightness level at the display panel that is consistent with a brightness level expressed by the scaler associated with the initial gray level. The method may proceed to block 720, wherein scaler 145 may provide the output image with an adjusted input gamma to timing controller 155. For example, the display panel may display the output image utilizing the adjusted input gray level as discussed in FIG. 2.

Subsequent to block 710, timing controller 155 may proceed to block 725 where timing controller 155 may calculate the maximum brightness according to equation (2) above. Timing controller 155 may also calculate the 2.2 gamma. In one embodiment, block 725 may be performed in parallel with block 715. The method may proceed to block 730 where timing controller 155 may display the output image received from scaler 145 at a display screen of display device 140. In this scenario, the display panel may have gamma curves similar to FIG. 4 and FIG. 6. Afterwards, the method ends.

Figure 8:
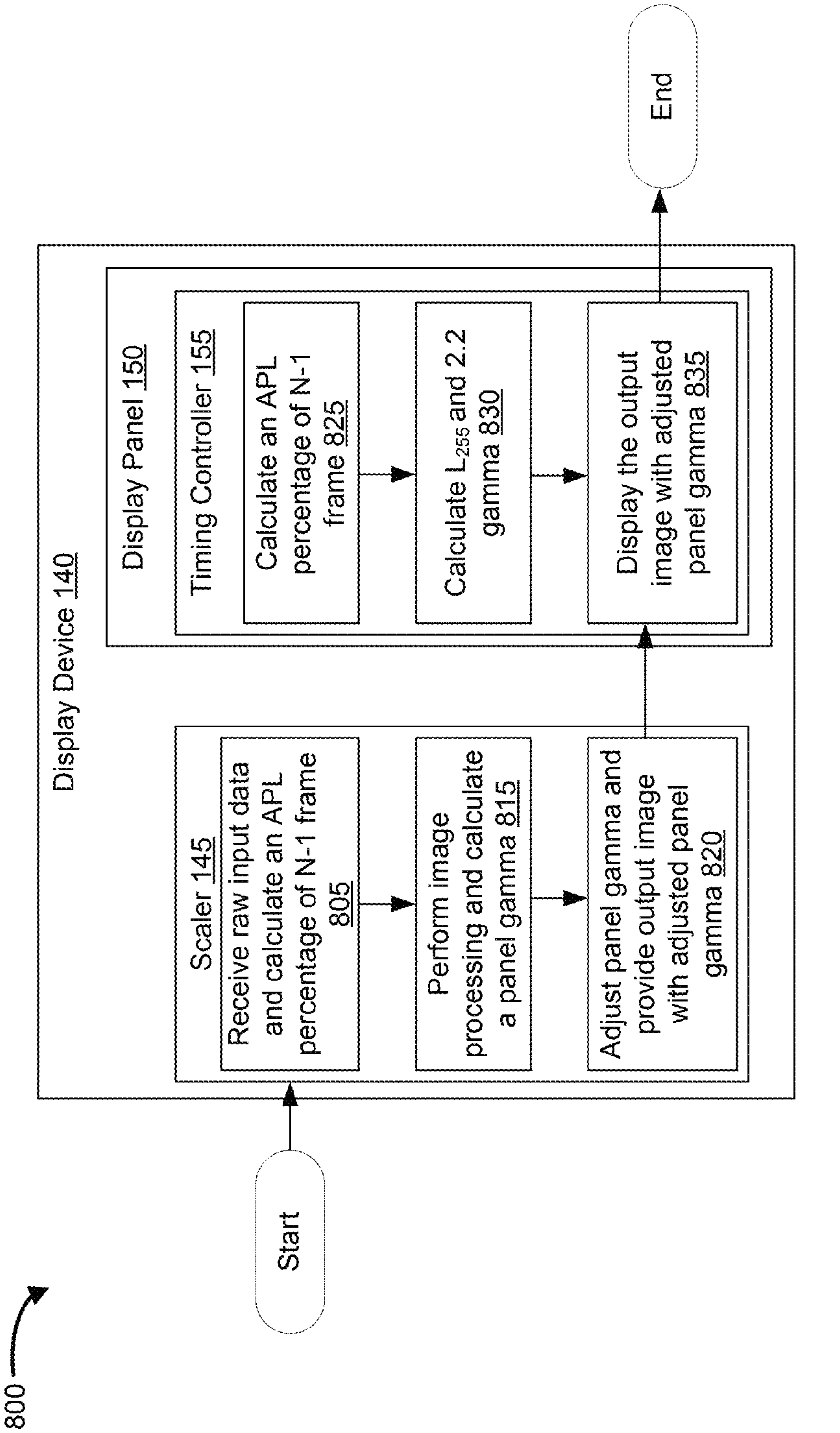
FIGS. 8 and 9 are flowcharts illustrating methods for producing consistent gamma in OLED display devices, according to an embodiment of the present disclosure.

FIG. 8 illustrates a portion of a flowchart of a method 800 for producing consistent gamma in OLED display devices, according to an embodiment of the present disclosure. Method 800 may be performed by any suitable component of display device 140 including, but not limited to, scaler

145 and display panel 150 that further includes timing controller 155 of FIG. 1. While embodiments of the present disclosure are described in terms of the components of display device 140 of FIG. 1, it should be recognized that other components may be utilized to perform the described method.

One of skill in the art will appreciate that this flow chart explains a typical example, which can be extended to applications or services in practice. It will be readily appreciated that not every block set forth in this flow diagram is always necessary and that certain blocks of method 800 may be combined, performed simultaneously, in a different order, or perhaps omitted, without varying from the scope of the disclosure. In addition, while embodiments of the present disclosure are described in terms of display device 140 of FIG. 1, it should be recognized that other systems may be utilized to perform the described method.

Method 800 typically starts at block 805 wherein scaler 145 may receive raw input data, such as raw image data as input from a processor or a GPU of an information handling system. Scaler 145 may also calculate the APL percentage of a previous (N−1) frame associated with the raw input data. The calculation of the APL percentage may be based on the equation (1) above. The method may proceed to block 815 where scaler 145 may process the raw input data which can include manipulating the raw image data to adjust various properties, such as resolution, refresh rate, etc. according to current computer graphics technology resulting in an output image.

Scaler 145 may also calculate and adjust panel gamma according to equation (5) above as discussed in FIG. 2, wherein the calculation is based on the APL percentage calculated at block 805. For example, the scaler may calculate a panel gray level associated with the output image that may provide a brightness level at the display panel that is consistent with a brightness level expressed by the scaler associated with the initial gray level. The method may proceed to block 820 where scaler 145 may provide the output image with an adjusted panel gamma to timing controller 155 for display as discussed in FIG. 2. For example, the display panel may display the output image utilizing the adjusted panel gray level.

At block 825, timing controller 155 may calculate the APL percentage of the previous frame similar to block 805. The method may proceed to block 830 where timing controller 155 may calculate maximum brightness according to equation (2) above as discussed in FIG. 2. Timing controller 155 may also calculate the 2.2 gamma. In one embodiment, blocks 825 and 830 may be performed in parallel with blocks 805 and 815. At block 835, timing controller 150 may display the output image received from scaler 145 at a display screen of display device 140 as discussed in FIG. 2. In this scenario, the display panel may have gamma curves similar to FIG. 4 and FIG. 6. Afterwards, the method ends.

Figure 9:
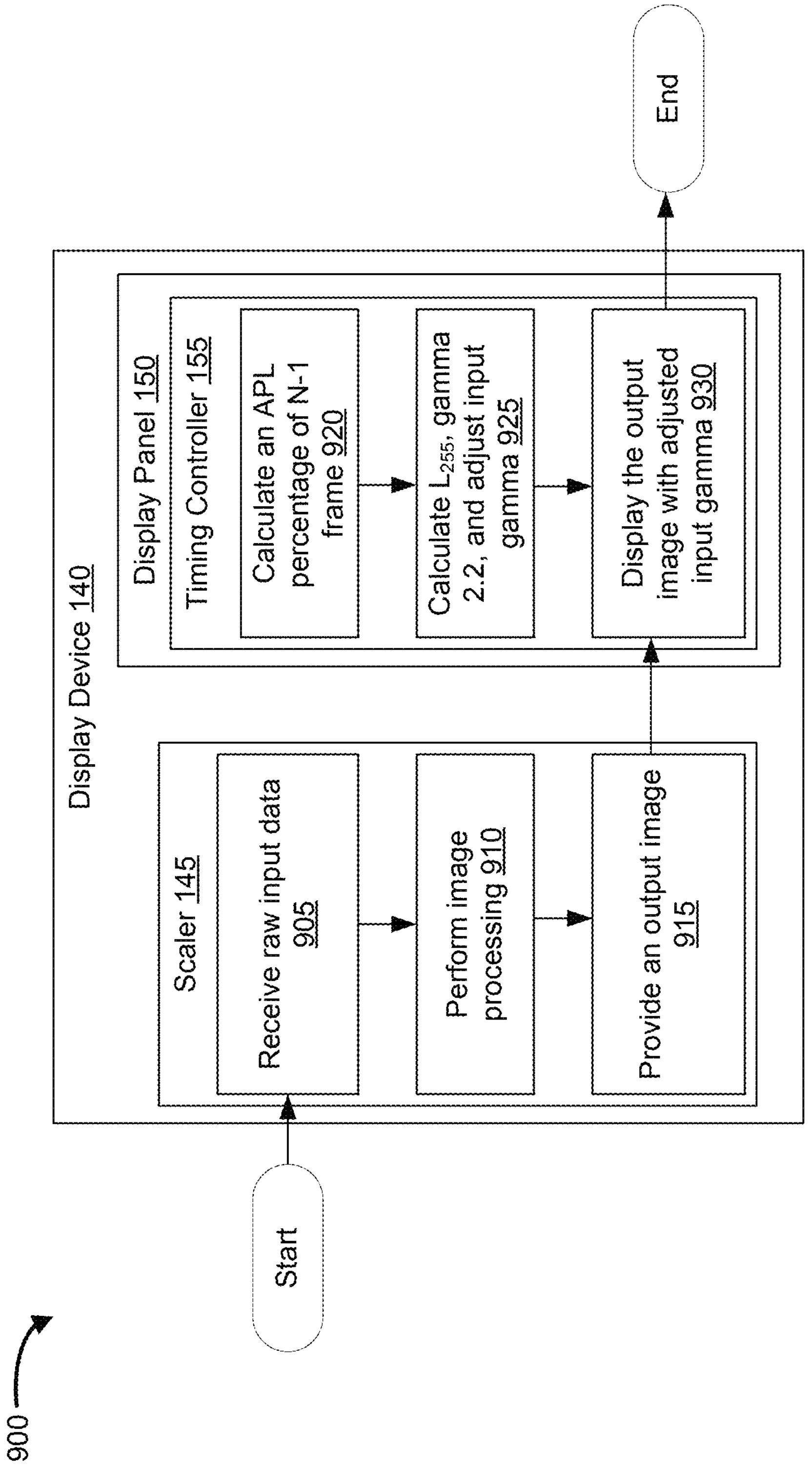

FIG. 9 illustrates a portion of a flowchart of a method 900 for producing consistent gamma in OLED display devices, according to an embodiment of the present disclosure. Method 900 may be performed by any suitable component of display device 140 including, but not limited to, scaler 145 and display panel 150 that further includes timing controller 155 of FIG. 1. While embodiments of the present disclosure are described in terms of the components of display device 140 of FIG. 1, it should be recognized that other components may be utilized to perform the described method.

One of skill in the art will appreciate that this flow chart explains a typical example, which can be extended to applications or services in practice. It will be readily appreciated that not every block set forth in this flow diagram is always necessary and that certain blocks of method 900 may be combined, performed simultaneously, in a different order, or perhaps omitted, without varying from the scope of the disclosure. In addition, while embodiments of the present disclosure are described in terms of display device 140 of FIG. 1, it should be recognized that other systems may be utilized to perform the described method.

Method 900 typically starts at block 905 wherein scaler 145 may receive raw input data that may include raw image data as input from a processor or a GPU of an information handling system. The method may proceed to block 915 where scaler 145 may process the raw input data which can include manipulating the raw image data to adjust various properties, such as resolution, refresh rate, etc. according to current computer graphics technology resulting in an output image. The method may proceed to block 915 where scaler 145 may provide the output image to timing controller 155.

At block 920, timing controller 155 may calculate the APL percentage of a previous (N−1) frame associated with the raw input data. The calculation of the APL percentage may be based on the equation (1) above. The method may proceed to block 925 where timing controller 155 may calculate maximum brightness and gamma 2.2. The maximum brightness may be calculated according to equation (2) above. The method may also calculate and adjust the input gamma according to equation (6) above as discussed in FIG. 2. The input gamma may be based on a panel gamma via calculating a panel gray level according to equation (5) above, wherein the calculation is based on the APL percentage calculated in block 920 as also discussed in FIG. 2.

Timing controller 155 may also calculate and adjust an input gamma according to equation (6) above as discussed in FIG. 2. In one embodiment, blocks 920 and 925 may be performed in parallel with blocks 905 and 910. At block 930, timing controller 155 displays the output image received from scaler 145 with an adjusted panel gamma at a display screen of display device 140. In this scenario, the display panel may have gamma curves similar to FIG. 4 and FIG. 6. Afterwards, the method ends.

FIG. 10 illustrates an embodiment of an information handling system 1000 including processors 1002 and 1004, a chipset 1010, a memory 1020, a graphics adapter 1030 connected to a video display 1034, a non-volatile RAM (NVRAM) 1040 that includes BIOS/EFI module 1042, a disk controller 1050, a hard disk drive (HDD) 1054, an optical disk drive (ODD) 1056, a disk emulator 1060 connected to a solid-state drive (SSD) 1064, an input/output (I/O) interface 1070 connected to an add-on resource 1074 and a trusted platform module (TPM) 1076, a network interface 1080, and a baseboard management controller (BMC) 1090. Processor 1002 is connected to chipset 1010 via processor interface 1006, and processor 1004 is connected to the chipset via processor interface 1008.

In a particular embodiment, processors 1002 and 1004 are connected via a high-capacity coherent fabric, such as a HyperTransport link, a QuickPath Interconnect, or the like. Chipset 1010 represents an integrated circuit or group of integrated circuits that manage the data flow between processors 1002 and 1004 and the other elements of information handling system 1000. In a particular embodiment, chipset 1010 represents a pair of integrated circuits, such as a northbridge component and a southbridge component. In another embodiment, some or all of the functions and features of chipset 1010 are integrated with one or more processors 1002 and 1004.

Memory 1020 is connected to chipset 1010 via a memory interface 1022. An example of memory interface 1022 includes a Double Data Rate (DDR) memory channel and memory 1020 represents one or more DDR Dual In-Line Memory Modules (DIMMs). In a particular embodiment, memory interface 1022 represents two or more DDR channels. In another embodiment, one or more processors 1002 and 1004 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 1020 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 1030 is connected to chipset 1010 via a graphics interface 1032 and provides a video display output 1036 to a video display 1034. An example of a graphics interface 1032 includes a Peripheral Component Interconnect-Express (PCIe) interface and graphics adapter 1030 can include a four-lane (x4) PCIe adapter, an eight-lane (x8) PCIe adapter, a 16-lane (x16) PCIe adapter, or another configuration, as needed or desired. In a particular embodiment, graphics adapter 1030 is provided down on a system printed circuit board (PCB). Video display output 1036 can include a Digital Video Interface (DVI), a High-Definition Multimedia Interface (HDMI), a DisplayPort interface, or the like, and video display 1034 can include a monitor, a smart television, an embedded display such as a laptop computer display, or the like.

NVRAM 1040, disk controller 1050, and I/O interface 1070 are connected to chipset 1010 via an I/O channel 1012. An example of I/O channel 1012 includes one or more point-to-point PCIe links between chipset 1010 and each of NVRAM 1040, disk controller 1050, and I/O interface 1070. Chipset 1010 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a USB, another interface, or a combination thereof. NVRAM 1040 includes BIOS/EFI module 1042 that stores machine-executable code (BIOS/EFI code) that operates to detect the resources of information handling system 1000, to provide drivers for the resources, to initialize the resources, and to provide common access mechanisms for the resources. The functions and features of BIOS/EFI module 1042 will be further described below.

Disk controller 1050 includes a disk interface 1052 that connects the disc controller to a hard disk drive (HDD) 1054, ODD 1056, and disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits SSD 1064 to be connected to information handling system 1000 via an external interface 1062. An example of external interface 1062 includes a USB interface, an institute of electrical and electronics engineers (IEEE) 1394 (Firewire) interface, a proprietary interface, or a combination thereof. Alternatively, SSD 1064 can be disposed within information handling system 1000.

I/O interface 1070 includes a peripheral interface 1072 that connects the I/O interface to add-on resource 1074, to TPM 1076, and to network interface 1080. Peripheral interface 1072 can be the same type of interface as I/O channel 1012 or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral interface 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on a separate circuit board, or add-in card disposed within information handling system 1000, a device that is external to the information handling system, or a combination thereof.

Network interface 1080 represents a network communication device disposed within information handling system 1000, on a main circuit board of the information handling system, integrated onto another component such as chipset 1010, in another suitable location, or a combination thereof. Network interface 1080 includes a network channel 1082 that provides an interface to devices that are external to information handling system 1000. In a particular embodiment, network channel 1082 is of a different type than peripheral interface 1072 and network interface 1080 translates information from a format suitable to the peripheral channel to a format suitable to external devices.

In a particular embodiment, network interface 1080 includes a NIC or host bus adapter (HBA), and an example of network channel 1082 includes an InfiniBand channel, a Fibre Channel, a Gigabit Ethernet channel, a proprietary channel architecture, or a combination thereof. In another embodiment, network interface 1080 includes a wireless communication interface, and network channel 1082 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 1082 can be connected to an external network resource (not illustrated). The network resource can include another information handling system, a data storage system, another network, a grid management system, another suitable resource, or a combination thereof.

BMC 1090 is connected to multiple elements of information handling system 1000 via one or more management interface 1092 to provide out-of-band monitoring, maintenance, and control of the elements of the information handling system. As such, BMC 1090 represents a processing device different from processor 1002 and processor 1004, which provides various management functions for information handling system 1000. For example, BMC 1090 may be responsible for power management, cooling management, and the like. The term BMC is often used in the context of server systems, while in a consumer-level device, a BMC may be referred to as an EC. A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 1090 can vary considerably based on the type of information handling system. BMC 1090 can operate in accordance with an Intelligent Platform Management Interface (IPMI). Examples of BMC 1090 include an Integrated Dell® Remote Access Controller (iDRAC).

Management interface 1092 represents one or more out-of-band communication interfaces between BMC 1090 and the elements of information handling system 1000 and can include an Inter-Integrated Circuit (I2C) bus, a System Management Bus (SMBus), a Power Management Bus (PMBUS), a Low Pin Count (LPC) interface, a serial bus such as a USB or an SPI, a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 1000, that is apart from the execution of code by processors 1002 and 1004 and procedures that are implemented on the information handling system in response to the executed code.

BMC 1090 operates to monitor and maintain system firmware, such as code stored in BIOS/EFI module 1042, option ROMs for graphics adapter 1030, disk controller 1050, add-on resource 1074, network interface 1080, or other elements of information handling system 1000, as needed or desired. In particular, BMC 1090 includes a network interface 1094 that can be connected to a remote management system to receive firmware updates, as needed or desired. Here, BMC 1090 receives firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 1090 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 1090, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a “F2” boot option, or another protocol or API, as needed or desired.

In a particular embodiment, BMC 1090 is included on a main circuit board (such as a baseboard, a motherboard, or any combination thereof) of information handling system 1000 or is integrated into another element of the information handling system such as chipset 1010, or another suitable element, as needed or desired. As such, BMC 1090 can be part of an integrated circuit or a chipset within information handling system 1000. An example of BMC 1090 includes an iDRAC or the like. BMC 1090 may operate on a separate power plane from other resources in information handling system 1000. Thus BMC 1090 can communicate with the management system via network interface 1094 while the resources of information handling system 1000 are powered off. Here, information can be sent from the management system to BMC 1090 and the information can be stored in a RAM or NVRAM associated with the BMC. Information stored in the RAM may be lost after the power-down of the power plane for BMC 1090, while information stored in the NVRAM may be saved through a power-down/power-up cycle of the power plane for the BMC.

Information handling system 1000 can include additional components and additional buses, not shown for clarity. For example, information handling system 1000 can include multiple processor cores, audio devices, and the like. While a particular arrangement of bus technologies and interconnections is illustrated for the purpose of an example, one of skill will appreciate that the techniques disclosed herein are applicable to other system architectures. Information handling system 1000 can include multiple central processing units (CPUs) and redundant bus controllers. One or more components can be integrated together. Information handling system 1000 can include additional busses and bus protocols, for example, $I^2C$ and the like. Additional components of information handling system 1000 can include one or more storage devices that can store machine-executable code, one or more communications ports for communicating with external devices, and various input and output (I/O) devices, such as a keyboard, a mouse, and a video display.

For purposes of this disclosure, information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 1000 can include processing resources for executing machine-executable code, such as processor 1002, a programmable logic array (PLA), an embedded device such as a System-on-a-Chip (SoC), or other control logic hardware. Information handling system 1000 can also include one or more computer-readable media for storing machine-executable code, such as software or data.

Although FIGS. 7, 8, and 9 show example blocks of methods 700, 800, and 900 in some implementations, methods 700, 800, and 900 may include additional blocks, fewer blocks, different blocks, or differently arranged blocks than those depicted in FIGS. 7, 8, 9. Those skilled in the art will understand that the principles presented herein may be implemented in any suitably arranged processing system. Additionally, or alternatively, two or more of the blocks of methods 700, 800, 900 may be performed in parallel. For example, blocks 905 and 920 of method 900 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a “device,” a “module,” a “unit,” a “controller,” or the like, the embodiments described herein can be configured as hardware. For example, a portion of an information handling system device may be hardware such as an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term “computer-readable medium” includes a single medium or multiple media, such as a centralized or distributed database, and/or associated caches and servers that store one or more sets of instructions. The term “computer-readable medium” shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

determining, by a processor of an information handling system, an average picture level percentage of a previous frame;

determining a brightness level of a current frame based on the average picture level percentage of the previous frame; and determining a panel gray level based on the brightness level of the current frame.

2. The method of claim 1, further comprising predicting a panel gamma curve based on the panel gray level.

3. The method of claim 1, further comprising adjusting an initial input gray level of the current frame.

4. The method of claim 1, further comprising utilizing the panel gray level when displaying an image.

5. The method of claim 1, wherein the determining of the panel gray level is further based on an input gray level.

6. The method of claim 1, wherein the determining of the panel gray level is further based on a peak brightness level associated with a display mode of a display device.

7. The method of claim 1, further comprising determining a scaler gamma curve.

8. An information handling system, comprising:

a processor; and a memory to store instructions that when executed causes the processor to perform operations including:

determining an average picture level percentage of a previous frame;

determining a brightness level of a current frame based on the average picture level percentage of the previous frame; and determining a panel gray level based on the brightness level of the current frame.

9. The information handling system of claim 8, wherein the operations further comprise predicting a panel gamma curve based on the panel gray level.

10. The information handling system of claim 8, wherein the operations further comprise adjusting an initial input gray level of the current frame.

11. The information handling system of claim 8, wherein the operations further comprise using the panel gray level in displaying an image.

12. The information handling system of claim 8, wherein the determining of the panel gray level is further based on an input gray level.

13. The information handling system of claim 8, wherein the determining of the panel gray level is further based on a peak brightness level associated with a display mode of a display device.

14. The information handling system of claim 8, wherein the operations further comprise determining a scaler gamma curve.

15. A non-transitory computer-readable medium to store instructions that are executable to perform operations comprising:

determining an average picture level percentage of a previous frame;

determining a brightness level of a current frame based on the average picture level percentage of the previous frame; and determining a panel gray level based on the brightness level of the current frame.

16. The non-transitory computer-readable medium of claim 15, wherein the operations further comprise predicting a panel gamma curve based on the panel gray level.

17. The non-transitory computer-readable medium of claim 15, wherein the operations further comprise adjusting an initial input gray level of the current frame.

18. The non-transitory computer-readable medium of claim 15, wherein the operations further comprise using the panel gray level in displaying an image.

19. The non-transitory computer-readable medium of claim 15, wherein the determining of the panel gray level is further based on an input gray level.

20. The non-transitory computer-readable medium of claim 15, wherein the determining of the panel gray level is further based on a peak brightness level associated with a display mode of a display device.

* * * * *